Figure 1:
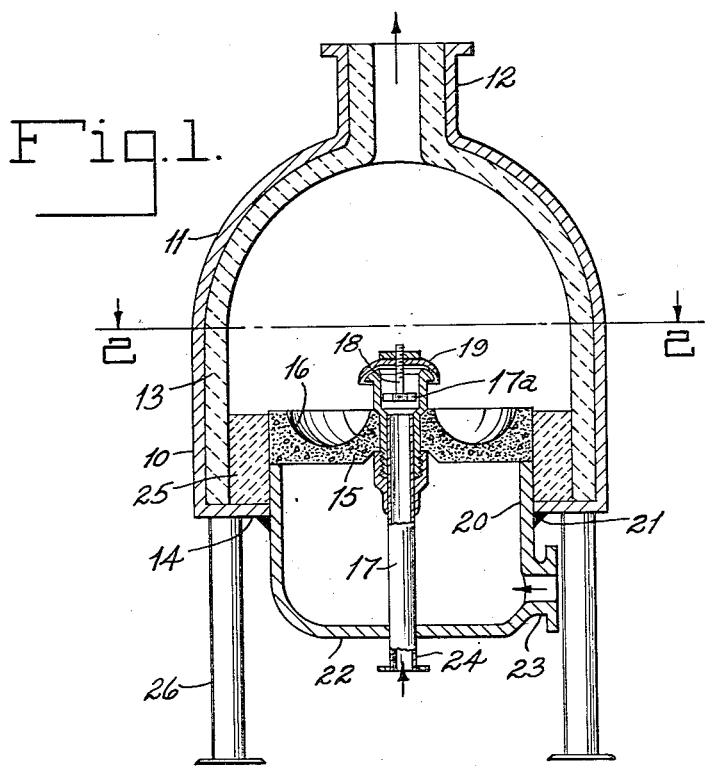

INVENTOR.
PAUL W. GARBO

Nov. 27, 1956 P. W. GARBO 2,772,149
GENERATION OF SYNTHESIS GAS AND APPARATUS THEREFOR
Original Filed Jan. 22, 1947 2 Sheets-Sheet 2

INVENTOR.
PAUL W. GARBO
BY
ATTORNEYS

United States Patent Office 2,772,149
Patented Nov. 27, 1956

2,772,149

GENERATION OF SYNTHESIS GAS AND APPARATUS THEREFOR

Paul W. Garbo, Freeport, N. Y., assignor to Hydrocarbon Research, Inc., New York, N. Y., a corporation of New Jersey Continuation of application Serial No. 723,548, January 22, 1947. This application December 13, 1951, Serial No. 261,764

5 Claims. (Cl. 48—196)

This application is a continuation of copending application Serial No. 723,548, filed January 22, 1947, and now forfeited, said copending application being a continuation-in-part of application Serial No. 700,819, filed October 2, 1946, which latter application eventuated in U. S. Patent 2,526,652, on October 24, 1950.

The present invention relates to the manufacture of combustible gas compositions and more specifically is concerned with the preparation of a so-called synthesis gas suitable for the manufacture of hydrocarbons, oxygenated hydrocarbons and the like by the catalytic reduction of carbon oxides.

The preparation of gaseous compositions comprising essentially carbon monoxide and hydrogen in predetermined proportion may be carried out by the controlled interaction of hydrocarbons and oxygen. It has been found desirable, however, to operate the reaction at relatively high temperature, whether in the presence of a catalyst or not, and it is frequently desirable, in order to control the relative proportions of hydrogen and carbon monoxide in the product gas as well as to utilize the available by-products of the synthesis reaction, to recycle to the synthesis gas generator these by-products comprising carbon dioxide and/or water vapor.

While hydrocarbons may be reacted with either water vapor or carbon dioxide in such manner that essentially the same reaction products are produced, reaction with water vapor tends toward a relatively increased proportion of hydrogen, while the use of carbon dioxide enhances the relative production of carbon monoxide. Moreover, while the aforesaid reaction of a hydrocarbon and oxygen is exothermic, the other two reactions referred to are endothermic and therefore can be carried out only to the extent that there is available heat from the exothermic reaction.

In the generation of synthesis gas the thermal requirements are such as normally to require preheating of the reactants. However, as is well known, substantial preheating of large volume of a gaseous mixture of hydrocarbons and oxygen is a dangerous procedure. On the other hand, where the reactants are separately preheated, the problem of effecting uniform admixture of all of the reactants at the zone of reaction and under optimum reaction condition arises.

It is accordingly an object of the present invention to provide for the reaction of combustible gases in controlled proportions for the purposes of generating a product of predetermined composition, under such conditions that the combustible reactants are intermingled and reacted in the reaction zone under controlled optimum reaction conditions. A further object is to provide for the production of a synthesis gas as above by the use of a gaseous hydrocarbon and oxygen. Another object contemplates carrying out the foregoing reactions by intermixing the complementary combustible components in an area of surface combustion supported at a predetermined temperature by the exothermic heat of reaction, while endothermically reacting components are introduced into and preferably through the reacting region of surface combustion.

To this end the invention involves supplying the hydrocarbon feed gas and oxygen in separate streams or in streams wherein the reactants are not in explosive proportion and subjecting the several streams to intermingling and surface combustion or reaction at the surface of a porous diaphragm, e. g., a porous refractory formed of a material adapted to withstand the reaction conditions. In order that intimate intermingling of the two reactant streams in combustible proportions will be delayed until both are in the surface combustion zone, one stream is caused to flow through the porous refractory wall or diaphragm which serves thereby as a barrier. The other reactant stream is caused to flow across the outer surface of the refractory member preferably in intimate scrubbing relationship with the said surface so that the emergent stream and the scrubbing stream are brought into thorough admixture at the surface of the diaphragm. Thus reaction occurs without flame on said surface which becomes heated to an incandescent state capable of being held at any temperature within a relatively wide range and effective to maintain the desired reaction.

It is advantageous to preheat the streams of reactants, for instance, in separate preheaters by exchange with the gaseous products of reaction from the generator. Under such conditions danger of flashback or explosion is eliminated and the process may operate continuously to produce synthesis gas efficiently.

It is, of course, true that the presence of endothermically reacting water vapor and/or carbon monoxide tend to lower temperature in the generator and therefore it is advantageous to control and limit these reactants such that proper temperature conditions may be maintained. On the other hand, temperature conditions are subject to control by various means involving, for example, the general design of the generator, the overall conservation of heat energy, and the quantity of oxygen used.

The resulting stream of synthesis gas, as is known, may be passed to a reactor wherein the hydrogen and carbon monoxide are catalytically converted into hydrocarbons or oxygenated hydrocarbons. Such a process is disclosed, for example, among others in the copending application, Ser. No. 668,764, filed May 10, 1946, in the name of Edwin T. Layng. This reaction forms no part of the present invention except insofar as by-product carbon dioxide is sometimes formed therein and may be recovered in known ways and recycled for generation of fresh synthesis gas in accordance with the present invention. Moreover, the present invention is not limited to production of a gas for this specific operation, but contemplates the preparation of a product comprising essentially hydrogen and carbon monoxide, irrespective of its ultimate use.

The generator for effecting the conversion of gaseous hydrocarbons into such a product, herein referred to as synthesis gas, comprises a chamber containing a porous barrier or wall advantageously constructed from a refractory material such as Carborundum, zirconia, fire clay or the like. Such barriers and walls, as is known, may be made with a multiplicity of capillaries or pore-like passages extending between opposite surfaces and capable of permitting diffusion or positive flow of a gas. A hydrocarbon gas maintained under any desired positive pressure on one side of the barrier passes through, and is met by a stream of oxygen sweeping directly across the other side at reaction conditions. Accordingly the gaseous hydrocarbon upon permeating the porous material passes to the surface where it undergoes reaction or surface combustion with the oxygen.

Advantageously oxygen compounds, such as carbon dioxide and water vapor, are introduced in admixture with the gaseous hydrocarbon and accordingly commence to react upon reaching the incandescent zone of reaction. The oxygen compounds may also be combined with the oxygen stream. So also it is possible to supply the oxygen stream, whether with or without the admixed oxygen compounds, through the porous combustion diaphragm or barrier, while sweeping the gaseous hydrocarbon across the combustion surface.

An advantage of the invention is that, by proper design, as for example, redirecting radiant energy back to the zone of surface combustion, it is possible to maintain this zone at a high temperature favorable to the complete quantitative interaction of the reactants and particularly the endothermically reacting materials. The surfaces of the reactor opposed to the zone of surface combustion are advantageously so arranged as to redirect their radiant energy upon the reacting surface and maintain surface temperatures above 2000° F., for example, 2500° F. and higher.

Another advantage of the invention is that it is possible to preheat the reactants to any desired temperature. In short, preheating can be carried out without special equipment and without danger of flashback or explosion in view of the fact that the feed gases are handled in non-combustible condition.

It is particularly important to note that intermingling of the reactants at the area of surface combustion must take place under such conditions that the surface directed reactant is jetted more or less forcibly across the area of surface combustion in such a manner as to scrub such surface in closely contacting relationship. This result may be effected by directing the reactant forcibly toward the surface, preferably at acute angle of impingement. On the other hand, the same result can be achieved by directing the gas stream across a combustion surface curved concavely whereby the surface progressively extends into its direction of flow and, thus, by impingement directs the stream of gas into a correspondingly curved path.

Further advantages reside in the fact that conversion is effectively carried out without the necessity of using conversion catalyst or even refractory packing. Furthermore, the invention provides simple means for effecting transfer of heat between the exothermic and endothermic reactions involved.

It is contemplated using substantially pure oxygen gas so as to reduce the amount of nitrogen entering the system and minimize heat losses. On the other hand, the invention is, at the same time, operable with streams of lower oxygen content and may, where desired, be carried out with air.

In order to describe the invention more in detail, reference will now be made to the drawings which illustrate more or less diagrammatically useful forms of generators for converting gaseous hydrocarbons into a synthesis gas in accordance with the present invention. In the drawings like parts are designated by like numerals throughout.

Figure 2:
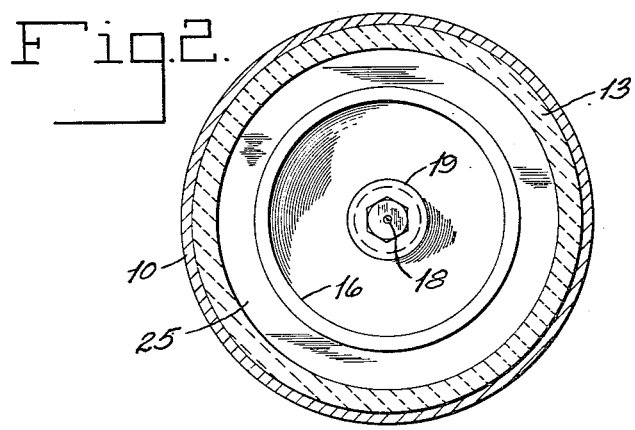
Figure 3:
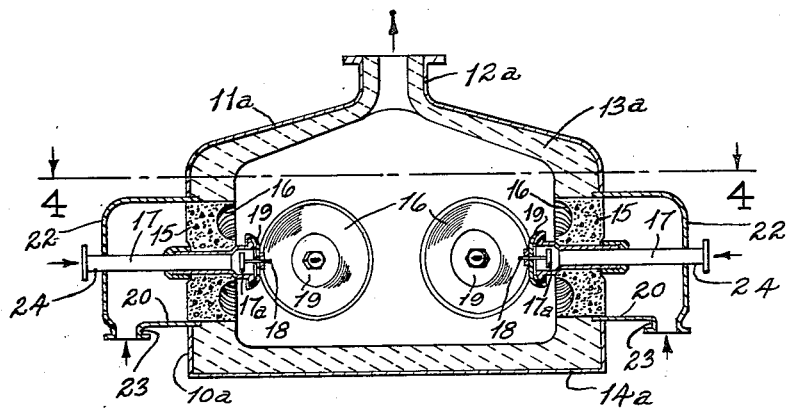
Figure 4:
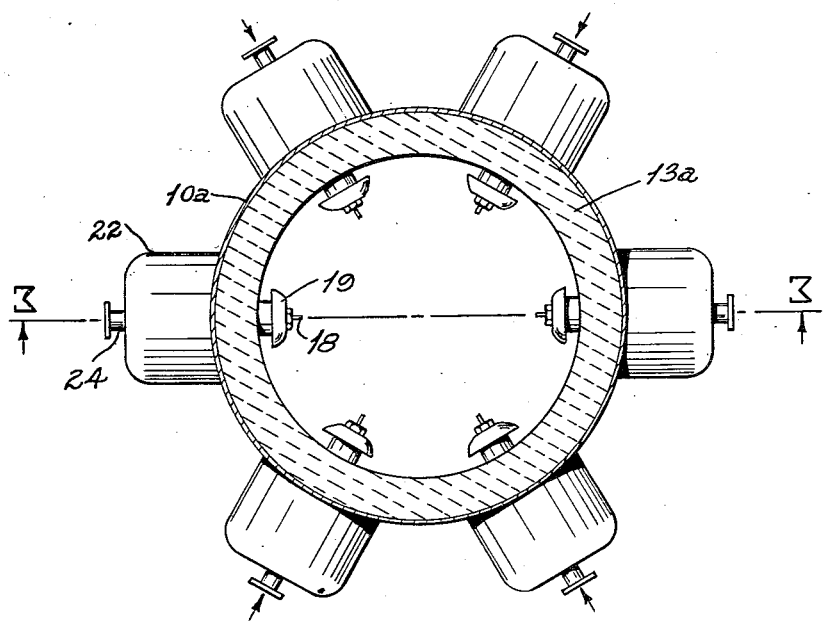

Fig. 1 of the drawings is a vertical section through a generator embodying a single burner. Fig. 2 is a horizontal section through the generator taken along the line 2—2 of Fig. 1. Fig. 3 is a vertical section through a generator employing a plurality of burners. Fig. 4 is a horizontal section through the generator of Fig. 3, taken along the line 4—4.

With reference to Figs. 1 and 2, the numeral 10 represents the cylindrical wall of a generator domed at the top as at 11 and provided with an outlet fitting 12 adapted to be connected with an outlet pipe or conduit for leading the gaseous products to any desired point of utilization. Since the gaseous products will normally be envolved at high temperature, it will usually be advisable to cool or quench this gas by any suitable means not shown and not forming a part of the present invention.

The interior of the generator is lined with any suitable refractory 13 advantageously of sufficient thickness to limit materially the loss of heat through the walls of the generator. As is known, the lining may be formed of fire brick or any other suitable refractory materials such as magnesia, zirconia, or the like.

The generator is provided with a bottom wall 14, apertured centrally to receive a burner construction. The burner shown comprises essentially a disc 15 of porous refractory material, the upper surface of which has an annular concave recess 16 disposed about its central axis providing a bowl-like configuration. Inlet conduit 17 extends coaxially through the central portion of the refractory disc 15 and projects thereabove, being provided with an internal spider arrangement 17a supporting an adjustment screw 18 upon which is mounted an inverted concave baffle 19. Advantageously, the upper rim of the conduit 17 is provided with an outer flanged portion having surfaces which lie in an annular plane parallel to the inner surfaces of baffle 19, adjacent its rim thus providing an uninterrupted annular orifice or nozzle which direct the outflowing gases from pipe 17 forcibly across the combustion surface 16. The sheet of gaseous fluid so directed continuously impinges the radially curving surfaces of the refractory disc, as indicated above, forcibly scrubbing said surfaces with the flow of gas.

The refractory disc 15 rests adjacent its annular margin upon the cylindrical wall 20 welded to the bottom wall 14 of the generator as at 21. The cylindrical wall 20 is closed at the bottom by a wall 22 and provided with an inlet fitting 23. Moreover, as clearly shown, the pipe 17 passes through the bottom wall 22 for connection to a suitable source of oxygen for example as at 24.

The lower portion of the generator about the burner may be treated in any suitable way but in the embodiment shown is provided with a refractory filling 25. Alternatively, the filling may be omitted and the product gases removed from the bottom portion of the generator in order to permit some degree of heat transfer to the incoming feed gases.

The whole generator structure is supported on suitable legs 26. While the generator is shown with the feed gas end at the bottom and the product gas outlet at the top, the unit may be erected in an inverted position so that the gases flow downwardly therethrough.

With reference to Figs. 3 and 4, a plurality of burners are disposed within a single generator. The generator comprises a cylindrical wall 10a of sufficient diameter to accommodate a plurality of burners. The generator is provided with a top 11a and an outlet 12a for discharge of gaseous products. The interior of the generator is lined with refractory lining 13a extending along the walls, across the top, and covering the bottom 14a. A plurality of burners are disposed along the cylindrical wall 10a, the refractory discs 15 of the burners placed with their inner recessed faces 16 toward the axis of the generator. In commercial scale operations a generator will normally house a plurality of such porous barriers or discs 15 arranged in one or more bands within the cylindrical shell of the generator. With such an arrangement, the radiant surfaces of the porous barriers are focussed on the axis of the cylindrical shell of the generator.

In operation any suitable hydrocarbon gas from any convenient source is introduced through the fitting 23 into the chamber formed by the cylinder 20 and passes upwardly through the fine pores of the refractory disc 15. At the same time oxygen is introduced through fitting 24 into the conduit 17 passing upwardly until it meets the baffle 19, thence being directed outwardly and downwardly past the orifice between the rim of the baffle 19 and the flanged extremity of the tube 17. The oxygen stream thus emanates as an annular sheet sweeping across the outer surface 16 of the refractory in impinging relationship.

At the start-up the concave surface 16 may advantageously be preheated either by extraneous means or by burning the hydrocarbon gas with an excess of oxygen. As soon as the surface temperature has become elevated sufficiently, the flow of gas is regulated so that reaction or flameless combustion will proceed in the concave surface 16 of the refractory. At the same time a stream of oxygen is supplied through the conduit 17 to support the partial combustion of hydrocarbon gas passing through the disc 15.

It is to be understood that when operating as above for the production of hydrogen and carbon monoxide, the proportion of hydrocarbon gas and oxygen is to be maintained, by any conventional means not shown, in the molar ratio of approximately 2:1. This requires first that the refractory barrier 15 possess a predetermined degree of permeability or porosity which will permit passage of the hydrocarbon gas at the required predetermined rate. Second, the adjustment of the baffle 19 with respect to the flanged upper rim of the tube 17 should be such as to eject the oxygen in a sheet or stream of appreciable velocity as the molar rate of supply determined by the rate of hydrocarbon feed.

The provision of porous refractory members is well known in the art and, as is known, these may be so constructed as to afford a wide range of porosity. Thus a relatively coarse grain sintered magnesia may be employed or there can be substituted porous refractory materials such as the well-known porous Carborundum. It may also be advantageous in some instances to configurate the lower surface of the disc 15 with an annular convex surface complementary to the concavity of the surface 16 so that the rate of transmission of gas will be substantially uniform to all points of the surface 16. With the types of porous refractory mentioned above with which I am familiar however, such arrangement is not usually necessary.

Similarly the adjustment of the baffle member 19 in order to permit scrubbing flow of the oxygen across the incandescent surface 16 is best determined by test under the supervision of one skilled in the art. With the rate of oxygen flow predetermined in accordance with a proportion of hydrocarbon gas supplied to the incandescent surface 16, the baffle 19 can be readily so arranged as to cause the oxygen stream to sweep the entire reaction or partial combustion surface.

In this connection it is important to note that for any specific supply of oxygen there is an area of burner surface beyond which it is impractical to secure good mixing. In other words, the emanating flow of reactants is such as to tend to direct the stream of oxygen away from the surface and while I have thus far found that a burner diameter greater than two feet appears to be inefficient, it is thought in view of the foregoing that proper adjustment of the baffle orifice may permit a wider range of construction.

While the foregoing description, in the interest of simplicity of exemplification, has been restricted to the use of reactants comprising a hydrocarbon gas and oxygen, the incoming stream of hydrocarbon or oxygen, or both, may embody a substantial proportion of carbon dioxide and water vapor, or either of them.

As clearly indicated above, these endothermically operative reactants depend upon the presence of oxygen in the feed gas for the heat energy necessary to support their reactions and thus are limited in the proportion to which they can be fed. Generally, the volume of carbon dioxide and/or water vapor entering the synthesis gas generator is not more than about 15% of the total volume of the reactants.

Attention has been particularly directed to the fact that the generator is advantageously so constructed that the inner surfaces which, under the conditions of operation, reach incandescence tend to minimize radiation from the generator. Good insulation of the interior surface of the generator and proper configuration of the generator materially reduce radiation to the end that the reaction zone of surface combustion assumes higher temperature than would otherwise be the case. In physics, it is known that radiation from a body is minimized by minimizing its surface and, hence, it is clear that a proper configuration of the generator is one which avoids extensive or excessive surface. Since geometry teaches that the sphere is the configuration having the minimum surface relative to the volume thereof, it is clear that the generator for any given volume is chosen to have a small internal surface area approximately equal to that of a sphere of equal volume.

As an example of one form of operation employing the principles of the present invention, with a generator construction as previously described and having a porous refractory barrier about 12″ in diameter, about 1000 cubic feet per hour of natural gas comprising by volume approximately 84% methane, 10% ethane, 4% higher hydrocarbons and 2% carbon dioxide and nitrogen is passed through the barrier, while approximately 675 cubic feet per hour of oxygen of 99.5% purity (the remainder consisting mainly of nitrogen) is passed through the central pipe 17 and the annular opening under baffle 19 into scrubbing relationship with the refractory surface. The generator has a reaction zone which is about 2 cubic feet in volume. The foregoing feed rates for the gaseous reactants are given for standard conditions. Both gaseous reactants have been preheated to a temperature of 1000° F. prior to their entry into the reaction zone. The reaction zone is maintained at a pressure of 250 pounds per square inch gauge. During the operation the surface is maintained at bright incandescence; the reaction gases leave the generator at a temperature of about 2500° F. The reaction gases on the dry basis comprise by volume 60% hydrogen, 35.5% carbon monoxide and minor percentages of carbon dioxide, unreacted methane and nitrogen corresponding to that introduced in admixture with the reactants.

The present invention provides a simple, compact and effective means for producing gaseous compositions of hydrogen and carbon monoxide within a wide range of proportions.

The carbon dioxide is usually separated in admixture with other normally gaseous components from the reaction product of hydrocarbon synthesis. This gaseous product, whether together with unreacted gases and hydrocarbon gases, or whether separated from the gaseous mixture through the conventional methods of carbon dioxide recovery, may be recycled to the generator.

As indicated above, it is advantageous to introduce the hydrocarbon gas through the porous barrier of the burner. On the other hand, where operating conditions are such that the hydrocarbon gas tends to deposit carbon within the pores of the barrier, it is advisable to reverse the operation so that oxygen passes through the porous surface and the hydrocarbon gas is swept thereacross. Alternatively, water vapor and/or carbon dioxide may be admixed with the hydrocarbon gas to suppress the formation of free carbon and the admixture passed through the porous refractory. Where it is desired to pass the hydrocarbon stream through the porous barrier and there is some tendency to form carbon in the pores, plugging of the barrier can be prevented by periodically passing oxygen through the barrier. In this manner, by burning the carbon with oxygen before the carbon accumulates to the point where the pores are plugged, the operation of the generator may be continued substantially uninterrupted for extended periods.

Operation of the apparatus of this invention may be best adjusted by experimentation. The temperature prevailing in the reaction zone is an important factor and normally should be maintained above 2000° F., preferably above about 2400° F., for optimum yield and product composition. Where the porous surface of the reaction zone is impregnated with a catalyst a somewhat lower temperature may be employed. The proportion of oxygen required to support these temperatures will depend upon the amount of preheat in the reactants, the amount of heat leaks from the generator and the proportion, if any, of carbon dioxide and water vapor in the reactants.

Moreover, while not usually requisite, the combustion surface of the porous refractory member may include any suitable catalytic materials for promoting the surface combustion or the specific reaction of the gases involved. Thus, for instance, the refractory surface may be impregnated with, or may comprise a layer of, nickel or such surface combustion promoters as thorium or cerium oxide.

While the specification refers specifically to the reaction of methane and oxygen, the invention is not so limited but contemplates the reaction of any gaseous or even vaporized hydrocarbons, which normally are liquid, with any of the conventional gaseous reactants capable of resulting in the generation of a hydrogen-carbon monoxide mixture. More specifically, the hydrocarbons may most advantageously comprise natural gas, which is usually largely methane, but the feed may consist of any of the higher gaseous hydrocarbons such for example as propane, or even normally liquid hydrocarbons which are readily vaporized by preheating.

It is to be observed that the invention is applicable to the generation of synthesis gas at pressures varying from atmospheric to about 500 pounds per square inch gauge, preferably at about 200 to 300 pounds per square inch gauge. Obviously, the pressure of the gas passing through the barrier must be somewhat higher than the pressure maintained within the reaction zone. The difference in pressure will vary with the porosity and thickness of the barrier and the desired velocity of gas passing therethrough. In general, a pressure difference of 10 to 40 pounds per square inch will suffice, but in some cases lower and higher pressure differences are resorted to in order to establish the desired flow of gas through the porous barrier.

Furthermore, it is advantageous to use oxygen of high purity, usually at least about 80% by volume of oxygen and preferably at least about 95%. The oxygen stream fed to the generator is generally preheated to a temperature of about 600° F. or higher, while the gaseous hydrocarbon stream is fed at a temperature approaching about 1000° F.

Those skilled in the art are fully cognizant of the difficulties commonly encountered in the operation of conventional synthesis gas generators, particularly generators filled with packing material whether simply refractory or catalytic, because of the formation of free carbon in the course of the reaction yielding synthesis gas. Prominent among the causes of these troubles are the poor mixing of the gaseous reactants and the presence of excessive surface within the generator. It is clear from the specification that the present invention assures uniform mixing of the gaseous reactants and avoids the use of packing material or extensive surface within the zone in which the synthesis gas is generated. Not only does the invention thus make it possible to generate synthesis gas without the formation of free carbon as a by-product but also, where some carbon is formed through poor control of the proportions of the reactants and other factors influencing the generation of syntthesis gas, such carbon formation does not have the same serious effect on the operation as in prior processes because the carbon formed is carried out of the generator of the present invention as innocuous particles suspended in the synthesis gas and easily separable therefrom. In prior generators, the carbon tends to build up so that eventually the generator becomes choked and operation is suspended until the carbon is cleaned out. Such stoppages are eliminated by this invention.

As hereinbefore disclosed, the present invention provides for the reaction of combustible gases in controlled proportions for the purpose of generating synthesis gas, under such conditions that the combustible reactants are intermingled and reacted in the reaction zone under controlled optimum reaction conditions. Furthermore, attention has been particularly directed to the fact that the generator for producing synthesis gas in accordance with this invention is of a configuration which provides a minimum of wall surface and which reduces the loss of radiation from the generator. As disclosed in parent application Serial No. 700,819, now U. S. Patent 2,526,652, the generator may be a refractory-lined chamber of a configuration different from those shown in the drawings of this application. This chamber, nevertheless, is likewise free from granular packing of any kind, so that the gases react in an open, unpacked space. More specifically, in order to inhibit production of free carbon, the ratio of internal generator surface to generator volume is maintained at as low a value as possible. Advantageously, the ratio of internal surface to volume in the generator or reaction zone is less than 1, the surface area and volume being computed in terms of feet as the linear unit of measurement.

Similarly, while the novel device shown in the drawings of this application to achieve intimate and rapid mixing of the gaseous reactants comprises a porous barrier, other mixing means may be employed. For instance, as taught in U. S. Patent 2,526,652, the two reactant streams may be discharged into the reactor in opposed relationship to assure good admixture or, alternatively, the two streams may be introduced through a mixing nozzle so that they reach the interior of the generator in condition for immediate reaction.

Obviously many modifications and variations of the invention as set forth above may be made without departing from the spirit and scope thereof and therefore only such limitations should be imposed as are indicated in the appended claims.

I claim:

1. An apparatus for high-temperature exothermic reactions of gaseous reactants, which comprises a circular porous barrier having an annular concavity on one face thereof, means for passing one gaseous reactant through said barrier, means centrally disposed relative to said circular barrier for supplying a second gaseous reactant in scrubbing relation to said concavity of said barrier, an insulated shell cooperating with said face of said barrier to form a reaction space, and an opening in said shell for the withdrawal of reaction gases from said reaction space.

2. The apparatus of claim 1 wherein there are a plurality of said circular barriers and said insulated shell is substantially cylindrical, said circular barriers being disposed along the inside surface of said shell and having their faces with the annular concavity substantially focused on the axis of said cylindrical shell.

3. An apparatus for high temperature exothermic reaction of gaseous reactants to generate a gaseous reaction product which comprises a porous refractory barrier having the form substantially of a disc having an inner surface formed with an annular concavity, a refractory-lined shell embracing the said inner surface of the porous barrier and forming therewith a reaction space, a reactant feed chamber at the opposite face of said porous barrier, means for continuously supplying one of said reactants to said chamber for passage through said barrier to the inner surface thereof, a tube passing through said porous barrier substantially coaxially of said annular concavity, a cap mounted on one extremity of said tube adjacent said inner surface of the barrier in spaced relation to said extremity providing therewith an annular orifice arranged to pass a second reactant stream as a jet of substantial velocity toward said concavity.

4. In a process for the generation of a gaseous mixture of hydrogen and carbon monoxide by the interaction of reactants comprising a hydrocarbon gas and oxygen, the steps which comprises passing hydrocarbon gas into a closed reaction zone through a porous barrier, forcibly directing a stream of substantially pure oxygen against the surface of said barrier within said reaction zone at an acute angle thereto whereby the oxygen is distributed along said surface into intimate contact with said hydrocarbon and said surface is maintained incandescent by flameless surface combustion, withdrawing from the vicinity of said surface the resulting reaction products consisting essentially of hydrogen and carbon monoxide, periodically discontinuing the flow of reactants and passing oxygen through said porous barrier, and thereafter restoring the flow of hydrocarbon gas through said barrier and reintroducing oxygen at said acute angle.

5. A process as defined in claim 4 wherein said surface of said porous barrier is concave with respect to said reaction zone.

References Cited in the file of this patent

UNITED STATES PATENTS

| | | |
|---|---|---|
| 1,213,470 | Finley | Jan. 23, 1917 |
| 1,592,474 | Szarvasy | July 13, 1926 |
| 1,960,608 | Weber et al. | May 29, 1934 |
| 1,966,610 | Chilowsky | July 17, 1934 |
| 2,051,363 | Beekley | Aug. 18, 1936 |
| 2,431,632 | Brandt | Nov. 25, 1947 |
| 2,483,132 | Gaucher | Sept. 27, 1949 |
| 2,491,518 | Riblett | Dec. 20, 1949 |
| 2,582,938 | Eastman et al. | Jan. 15, 1952 |